US006265028B1

(12) United States Patent
Zhao et al.

(10) Patent No.: US 6,265,028 B1
(45) Date of Patent: Jul. 24, 2001

(54) METHOD OF COATING SUBSTRATES COMPRISING POLYURETHANE

(75) Inventors: Cheng-Le Zhao, Schwetzingen; Eckehardt Wistuba, Bad Dürkheim; Roland Baumstark, Neustadt; Gerald Wildburg, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/348,293

(22) Filed: Jul. 7, 1999

(30) Foreign Application Priority Data

Jul. 8, 1998 (DE) ............................................. 198 30 555

(51) Int. Cl.$^7$ ...................................................... B05D 3/02
(52) U.S. Cl. .................................... 427/372.2; 427/385.5; 427/393.5
(58) Field of Search .............................. 427/372.2, 385.5, 427/393.5

(56) References Cited

U.S. PATENT DOCUMENTS

| | | |
|---|---|---|
| 3,356,627 | 12/1967 | Scott et al. . |
| 3,429,852 | 2/1969 | Skoultchi et al. . |
| 3,574,617 | 4/1971 | Skoultchi et al. . |
| 4,104,220 | 8/1978 | Sims . |
| 4,111,877 | 9/1978 | Dixon et al. . |
| 4,148,987 | 4/1979 | Winey . |
| 4,151,142 | 4/1979 | Herman et al. . |
| 4,219,454 | 8/1980 | Iacoviello et al. . |
| 4,302,375 | 11/1981 | Dixon et al. . |
| 4,319,032 | 3/1982 | Sandri et al. . |
| 4,426,503 | 1/1984 | Sandri et al. . |
| 4,500,673 | 2/1985 | Devona et al. . |
| 4,855,349 | 8/1989 | Ingle . |
| 5,021,469 | 6/1991 | Langerbeins et al. . |
| 5,055,511 | 10/1991 | Ingle . |
| 5,073,445 | 12/1991 | Ingle . |
| 5,120,607 | 6/1992 | Ingle . |
| 5,135,813 | 8/1992 | Ingle . |
| 5,210,199 | 5/1993 | Grosius et al. . |
| 5,441,775 | 8/1995 | Beck et al. . |
| 5,468,800 | 11/1995 | Fölsch et al. . |
| 5,498,723 | 3/1996 | Riondel et al. . |
| 5,567,826 | 10/1996 | Knebel et al. . |

FOREIGN PATENT DOCUMENTS

| | | |
|---|---|---|
| 1150434 | 7/1983 | (CA) . |
| WO 91/12243 | 8/1991 | (WO) . |
| WO 95/09896 | 4/1995 | (WO) . |
| WO 98/16589 | 4/1998 | (WO) . |

OTHER PUBLICATIONS

Adolf Franck, Kunststoff–Kompendium, 4$^{th}$ ed. Vogel Verlag, pp. 393–406, 1996 (with English Abstracts).
R. W. Kreis, et al., pp. 222–243, "Development of a Ureido Functional Monomer for Promoting Wet Adhesion is Latex Paints", Feb. 3–5, 1988.

*Primary Examiner*—Edward J. Cain
(74) *Attorney, Agent, or Firm*—Oblon, Spivak, McClelland, Maier & Neustadt, P.C.

(57) ABSTRACT

Aqueous formulations comprising:
  i) at least one film-forming polymer A constructed from ethylenically unsaturated monomers M and present in dispersed form in the aqueous formulation, said monomers M comprising at least one monethylenically unsaturated monomer M1 of the formula I

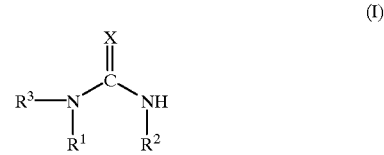

(I)

where X, R$^1$, R$^2$ and R$^3$ are as defined in claim 1 and
  ii) at least one compound B having two or more aldehyde groups are used for coating substrates consisting essentially of polyurethanes.

8 Claims, No Drawings

METHOD OF COATING SUBSTRATES COMPRISING POLYURETHANE

The present invention relates to a method of coating a substrate by applying an aqueous polymer formulation comprising a film-forming polymer A in the form of its aqueous dispersion onto a substrate, the substrate consisting essentially of polyurethane.

Aqueous formulations based on film-forming polymers are widely employed as protective surface coating systems. The polymer in the formulation together with any fillers or pigments therein combine on drying to form a solid polymer film which protects the coated substrate against environmental effects such as sunlight, moisture and mechanical or chemical stresses.

In architectural preservation, especially in exterior applications, stringent requirements are set for the stability of such coatings. In addition to chemical resistance and high photostability they are required to have high elasticity and tear strength so that when the components experience dimensional changes as a result of fluctuating temperatures no cracks are formed in the coating. The coatings must also not become tacky at high temperatures, since that could have unwanted dirt pickup consequences. A further requirement is that the coatings show little tendency to absorb water.

Particular importance is placed on the good adhesion of the coatings to the underlying material to be sealed or to the surface of the substrate to be coated. Formulations based on aqueous polymer dispersions often fail to meet this requirement on hydrophobic substrates which consist essentially of polyurethanes (polyurethane materials), such as on polyurethane foams, despite meeting the other requirements made of them. And yet polyurethane materials find widespread use as construction materials in architecture, an example being polyurethane foams used to insulate flat-roof constructions.

WO 95/09896 and EP-A 609 793 disclose aqueous polymer formulations which comprise at least one polymer having urea groups in the form of an aqueous dispersion and at least one polyaldehyde compound. The use of such formulations as binders for emulsion paints is described.

EP-B 258 988 describes a coating composition for polyurethane foams which comprises a film-forming polymer having acetoacetyl or cyanoacetyl groups. A feature of the coating composition is its adhesion to polyurethane foam surfaces. While the tear strength of such binder polymers is enhanced by the incorporation of the functional groups, however, there is at the same time a marked reduction in the elasticity of these coatings, and thus a risk of cracking in the coating.

WO 98/16589 discloses the use of polymer formulations for coating hydrophobic surfaces, said formulations comprising a polymer having keto or aldehyde groups and at least one compound having two or more primary amino groups, such as the dihydrazide of a dicarboxylic acid. The coatings feature high elasticity and tear strength.

It is an object of the present invention to provide a formulation based on an aqueous polymer dispersion (aqueous polymer formulation) which to a high extent meets the profile of requirements made of coating compositions and which adheres well to coatings on substrates consisting essentially of polyurethanes.

We have found that this object is achieved by aqueous polymer formulations comprising at least one film-forming polymer A having urea or thiourea groups and at least one compound B having at least two aldehyde groups.

The present invention therefore provides a method of coating a substrate consisting essentially of polyurethanes, said method comprising the application of an aqueous formulation onto the substrate and said aqueous formulation comprising i) at least one film-forming polymer A constructed from ethylenically unsaturated monomers M and present in dispersed form in the aqueous formulation, said monomers M comprising at least one monomer M1 of the formula I

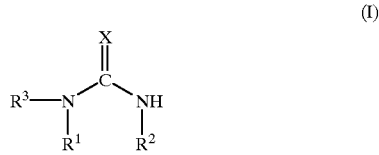

where
$R^1$ and $R^2$ independently of one another are hydrogen, linear or branched $C_1$–$C_5$-alkyl or, together are a $C_2$–$C_4$-alkylene group
which is unsubstituted or substituted once or twice by $C_1$–$C_5$-alkyl, $C_1$–$C_4$-alkyloxy and/or hydroxyl,
X is oxygen or sulfur, and
$R^3$ is a monoethylenically unsaturated radical of 2 to 20 carbon atoms,
and at least one monomer M2 copolymerizable with said monomer M1, and ii) at least one compound B having two or more aldehyde groups.

Substrates consisting essentially of polyurethanes (polyurethane materials) embrace moldings, molding compounds and components made of polyurethanes, coatings, brushing compositions based on polyurethanes and solid polyurethane foams in the form, for example, of constructional slab stock or foam insulation. They generally contain at least 50% by weight, based on their total mass, of polyurethanes, e.g., polyesterurethanes and/or polyetherurethanes. The surfaces of substrates comprising polyurethane are generally of particularly low tension, generally <50 mN/m, preferably <40 mN/m and, in particular, <30 mN/m, and of low polarity, and are not adhered to well, if at all, by conventional coating compositions. The formulations of the invention are particularly suitable for coating the surfaces of polyurethane foams such as those used as slabstock in flat-roof construction or as insulating materials. A compilation of typical polyurethane foams is given for example in A. Franck, Kunststoffkompendium, 4th Edition, Vogel Verlag, Würzburg 1996, pp. 393–406, especially Table 8.4.1.

Preferred monomers M1 are

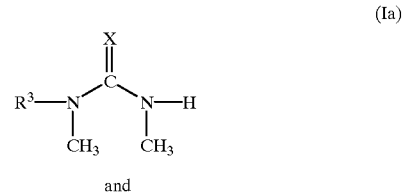

and

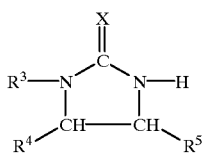
(Ib)

where $R^3$ is as defined above and each of the substituents $R^4$, $R^5$ in formula Ib can be hydrogen, a hydroxyl group or a $C_1$–$C_4$-alkyloxy group. Preferably, $R^4$ and $R^5$ are both hydrogen or $R^4$ is hydrogen and $R^5$ is a $C_1$–$C_4$-alkyloxy group.

Preference is given to monomers M1 of formula I in which X is oxygen.

$R^3$ is generally a monoethylenically unsaturated radical of 2 to 20 carbon atoms. $R^3$ is preferably a radical of the formula

where X is a single bond, $CH_2$, a phenylene group, a carbonyl group, a carbonyloxy group or a carbamoyl group and Y is a single bond or a $C_1$–$C_{10}$-alkylene group which is unsubstituted or substituted by hydroxyl and/or carbonyl groups and/or is interrupted by one or more nonadjacent oxygen atoms or imino groups.

Examples of suitable radicals $R^3$ are $CH_2=CH-$, $CH_2=CH-CH_2-$, $CH_2=CH-CH_2-O-CH_2-CH(OH)-CH_2-$, $CH_2=CH-CH_2-O-CH_2-CH(OH)-CH_2-NH-CH_2-CH_2-CH_2=CH-CH_2-O-CH_2-CH(OH)-CH_2-O-CH_2-CH_2-CH_2=C(CH_3)-CH_2-$, $CH_2=C(CH_3)-C(O)-$, $CH_2=CH-C(O)-$, $CH_2=CH-C(O)-O-CH_2-CH_2-$, $CH_2=CH-C(O)-NH-CH_2-CH_2-$, $CH_2=C(CH_3)-C(O)-O-CH_2-CH_2-$, $CH_2=C(CH_3)-C(O)-NH-CH_2-CH_2-$, $CH_2=CH-C(O)-O-CH_2-C(O)-O-CH_2-CH_2-$, $CH_2=CH-C(O)-O-CH_2-C(O)-NH-CH_2-CH_2-CH_2=CH-C(O)-NH-CH_2-C(O)-O-CH_2-CH_2-$, $CH_2=C(CH_3)-C(O)-O-CH_2-C(O)-O-CH_2-CH_2-$, $CH_2=C(CH_3)-C(O)-O-CH_2-C(O)-NH-CH_2-CH_2-CH_2=C(CH_3)-C(O)-NH-CH_2-C(O)-O-CH_2-CH_2-$.

Advantageous copolymerizable monomers M1 are the following:
N-vinylethyleneurea,
N-[(methacryloyloxyacetoxyethyl)]ethyleneurea,
N-(2-acryloyloxyethyl)ethyleneurea,
N-[(3-allyloxy-2-hydroxypropyl)aminoethyl]ethyleneurea,
N-(acrylamidoethyl)ethyleneurea, N-allylethyleneurea,
N-(2-methacryloyloxyacetamidoethyl)ethyleneurea, and especially
N-(2-methacryloyloxyethyl)ethyleneurea (also named [1-(2-methacryloyloxyethyl)imidazolin-2-one]),
N-(methacrylamidoethyl)ethyleneurea and
N-[(3-allyloxy-2-hydroxypropyl)aminoethyl]ethyleneurea.

Further suitable monomers M1 are described in U.S. Pat. No 3,356,627, U.S. Pat. No. 4,104,220, U.S. Pat. No. 4,111,877, U.S. Pat. No. 4,219,454, U.S. Pat. No. 4,319,032, U.S. Pat. No. 4,500,673, U.S. Pat. No. 4,426,503, U.S. Pat. No. 5,210,199, U.S. Pat. No. 5,498,723, U.S. Pat. No. 5,567,826, EP-A 3870, EP-A 9880, EP-A 29 891, EP-A 379 892 and WO 91/12243. Yet further suitable monomers M1 are specified in a review article by R. W. Kreis and A. M. Sherman, "Developments in Ureido Functional Monomer for Promoting Wet Adhesion in Latex Paints", Water-Borne and Higher-Solids Coating Symposium, Feb. 3–5, 1998, New Orleans, La.

Said monomers M1 make up usually from 0.1 to 10% by weight, preferably from 0.2 to 5% by weight and, in particular, from 0.5 to 4% by weight of the total amount of monomers M.

In addition to the monomers M1 the monomers M include at least one monomer M2 of a limited solubility in water (i.e. <60 g/l at 25° C.; known as hydrophobic monomers) which is copolymerizable with the monomer M1 and which is responsible for the filmforming of polymer A. Monomers M2 are generally selected from vinylaromatic monomers such as styrene, α-methylstyrene, ortho-chlorostyrene or vinyltoluenes, vinyl esters of $C_1$–$C_{18}$-, preferably $C_1$–$C_{12}$ monocarboxylic acids, such as vinyl acetate, vinyl propionate, vinyl butyrate, vinyl valerate, vinyl hexanoate, vinyl-2-ethylhexanoate, vinyl decanoate, vinyl laurate, vinyl stearate and vinyl esters of the Versatic® acids (Versatice® acids are branched aliphatic carboxylic acids of 5 to 11 carbon atoms). Also suitable are esters of α,β-ethylenically unsaturated $C_3$–$C_8$ mono- or dicarboxylic acids with preferably $C_1$–$C_{12}$- and especially $C_1$–$C_8$-alkanols or $C_5$–$C_8$-cycloalkanols. Examples of suitable $C_1$–$C_{12}$-alkanols are methanol, ethanol, n-propanol, isopropanol, 1-butanol, 2-butanol, isobutanol, tert-butanol, n-hexanol and 2-ethylhexanol. Examples of suitable cycloalkanols are cyclopentanol and cyclohexanol. Examples are esters of acrylic, methacrylic, crotonic, maleic, itaconic or fumaric acid, such as methyl (meth)acrylate, ethyl (meth)acrylate, isopropyl (meth)acrylate, n-butyl (meth)acrylate, isobutyl (meth)acrylate, 1-hexyl (meth)acrylate, tert-butyl (meth) acrylate, 2-ethylhexyl (meth)acrylate, dimethyl maleate, and di-n-butyl maleate. It is also possible to employ $C_4$–$C_8$ conjugated dienes, such as 1,3-butadiene, isoprene or chloroprene, $C_2$–$C_6$ olefins, such as ethylene, propene, 1-butene and isobutene, and vinyl chloride as monomers M2. The monomers M2 make up preferably from 80 to 99.9% by weight, in particular from 90 to 99.9% by weight and, especially, from 95 to 99.5% by weight, based on the total weight of the monomers M.

Preferred monomers M2 are the vinylaromatic monomers, especially styrene and the esters of acrylic and methacrylic acid with $C_1$–$C_{12}$-alkanols. A particularly preferred embodiment of the present invention relates in particular to the use of those polymers A whose copolymerized monomers M2 comprise exclusively the above-mentioned esters of acrylic and methacrylic acid with $C_1$–$C_{12}$-alkanols.

The monomers M generally also include monomers M3 which are different from the monomers M1 and M2 and have an acid function, or salts thereof. These monomers are copolymerized preferably in amounts from 0.1 to 10% by weight and, in particular, from 0.2 to 5% by weight, based on the total monomer amount. Examples of the monomers M3 include α,β-monoethylenically unsaturated mono- and dicarboxylic acids of 3 to 10 carbon atoms, ethylenically unsaturated sulfonic acids, ethylenically unsaturated phosphonic acids or dihydrogen phosphates and their water-soluble salts, such as their sodium salts. Preferred monomers M3 are ethylenically unsaturated $C_3$–$C_8$ carboxylic acids and $C_4$–$C_8$ dicarboxylic acids, examples being itaconic, crotonic, vinylacetic and acrylamidoglycolic acid and especially acrylic and methacrylic acid.

The monomers M frequently also include neutral or nonionic, modifying monomers M4, which are of higher solubility in water, i.e. >60 g/l at 25° C. and 1 bar, and are different from the monomers M1 and M3. Examples of monomers M4 are the amides or N-alkylolamides of the abovementioned carboxylic acids, examples being acrylamide, methacrylamide, N-methylolacrylamide and N-methylolmethacrylamide, the hydroxyalkyl esters of the abovementioned ethylenically unsaturated carboxylic acids, such as hydroxyethyl acrylate, hydroxyethyl methacrylate, hydroxypropyl acrylate and hydroxypropyl methacrylate. Further suitable monomers M4 are ethylenically unsaturated nitriles such as acrylonitrile or methacrylonitrile. The monomers M may embrace monomers M4 in amounts of up to 20% by weight, in the case of monomers M4 other than the abovementioned nitrites in amounts of up to 10% by weight, and preferably up to 5% by weight.

The monomers M may include up to 1% by weight of siloxane-functional monomers (monomers M5), examples being vinyltrialkoxysilanes, such as vinyltrimethoxysilane, alkylvinyldialkoxysilanes or (meth)acryloxyalkyltrialkoxysilanes, such as (meth)acryloxyethyltrimethoxysilane and (meth)acryloxypropyltrimethoxysilane.

Still further, the monomers M may include bifunctional monomers M6. Where desired these monomers are employed in a minor amount, generally from 0.1 to 5% by weight and, in particular not more than 1% by weight, based on the total amount of monomer M. The monomers M6 generally have two non conjugated, ethylenically unsaturated bonds. Examples of monomers M6 are the diesters of dihydric alcohols with α,β-monoethylenically unsaturated $C_3$–$C_8$ carboxylic acids, such as glycol bisacrylate, or esters of α,β-unsaturated carboxylic acids with alkenols, such as bicyclodecenyl (meth)acrylate. Preferred polymers A contain no copolymerized monomers M6.

The nature of the polymer formulations of the invention depends also on the glass transition temperature (DSC, midpoint temperature, ASTM D 3418-82) of the polymer A. It is known that the film forming characteristics of the polymer A depend on the glass transition temperature. In general the minimum film forming temperature of a polymer (in a dispersion) is slightly below the glass transition temperature of a polymer. The minimum film forming temperature is known as the temperature which is necessary for the polymer to form a clear polymer film upon drying. If it is too high, the coating composition lacks sufficient strength and loses its elasticity at low temperatures. If it is too low, the coating remains tacky even after curing. The glass transition temperature of the relevant polymers A is therefore generally below 50° C., preferably below 20° C. and, with particular preference, below 10° C. In general, however, it is above −60° C., preferably above −40° C. and, in particular, above −35° C. In one special embodiment of the present invention the polymer A has a glass transition temperature from −30° C. to below −10° C. In this context it proves useful to estimate the glass transition temperature $T_g$ of the dispersed polymer P. According to Fox (T. G. Fox, Bull. Am. Phys. Soc. (Ser. II) 1, 123 [1956] and Ullmanns Encyklopädie der technischen Chemie, 4th Edition, Volume 19, Weinheim (1980), pp. 17 and 18) the glass transition temperature of copolymers at high molecular masses is given in good approximation by the $$\frac{1}{T_g} = \frac{X^1}{T_g^1} + \frac{X^2}{T_g^2} + \cdots \frac{X^n}{T_g^n}$$

where $X^1$, $X^2$, . . . , $X^n$ are the mass fractions of the monomers 1, 2, . . . , n and $T_g^1$, $T_g^2$, . . . , $T_g^n$ the glass transition temperatures, in degrees Kelvin, of the homopolymers of each of the monomers 1, 2, . . . , n. Said temperatures are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989.

From what has been said it is clear that the glass transition temperature of polymer A can be established by choosing a suitable principal monomer M2 having a glass transition temperature within the desired range and by combining at least one monomer M2a of high glass transition temperature with at least one monomer M2b of low glass transition temperature, the latter approach being preferred.

In a preferred embodiment of the present invention the constituent monomers M of the polymer A include at least one monomer M2a whose homopolymer in the limiting case of a very high (infinite) molecular mass has a glass transition temperature $T_g \geq 30°$ C., typically $\geq 70°$ C., and at least one monomer M2b whose homopolymer has a glass transition temperature $T_g < 20°$ C. Examples of monomers M2a suitable for this purpose are styrene, α-methylstyrene, methyl methacrylate, ethyl methacrylate, n- and iso-propyl methacrylate, n-, iso- and tert-butyl methacrylate, tert-butyl acrylate and vinyl acetate and also, if desired, acrylonitrile and methacrylonitrile, the two nitriles preferably accounting for not more than 30% by weight of the monomers M2a. Examples of monomers M2b suitable for this purpose are the $C_1$–$C_{12}$-alkyl acrylates, butadiene, vinyl versatates, especially ethyl acrylate, n-butyl acrylate and 2-ethylhexyl acrylate. Particular preference is given to monomer combinations M2a/M2b comprising styrene and/or methyl methacrylate and also n-butyl acrylate and, if desired, 2-ethylhexyl acrylate. In the formulations of the invention preferably less than 50% by weight of the monomers M2 are selected from monomers M2a and more than 50% by weight from monomers M2b.

In a particularly preferred embodiment of the present invention the polymer A is composed of i) from 5 to 25% by weight, preferably from 10 to 20% by weight, of styrene, methyl methacrylate, tert-butyl methacrylate and mixtures thereof, especially methyl methacrylate as sole monomer M2a, ii) from 70 to 94.8%, preferably from 80 to 90% by weight, of n-butyl acrylate, 2-ethyl hexyl acrylate and mixtures thereof, iii) from 0.1 to 5% by weight, preferably from 0.5 to 4% by weight, of at least one monomer M1 selected in particular from N-(2-methacryloyloxyethyl)imidazolin-2-one, N-(2-methacrylamidoethyl)imidazolin-2-one and N-[(3-allyloxy-2-hydroxypropyl)aminoethyl]imidazolin-2-one, and iv) from 0.1 to 5% by weight, preferably from 0.5 to 4% by weight, of at least one monomer M3, preferably an ethylenically unsaturated carboxylic acid and especially acrylic and/or methacrylic acid, the proportions by weight of monomers M1, M2a, M2b and M3 adding up to 100% by weight.

Polymers A of this kind are particularly suitable for formulations of the invention that are employed as flexible coating compositions for insulating coats and construction elements made from polyurethane foam, for example, in flat-roof construction.

The polymers A of the invention are generally prepared by free-radical aqueous emulsion polymerization of the abovementioned monomers in accordance with known techniques.

Suitable free-radical polymerization initiators are, in principle, peroxides, such as hydrogen peroxide, organic peroxides and hydroperoxides such as dibenzoyl peroxide and tert-butyl hydroperoxide, peracids such as peroxopivalate, alkali metal and ammonium peroxodisulfates such as sodium peroxodisulfate or ammonium peroxodisulfate, and azo compounds. Also suitable are redox initiator systems, which are composed of at least one organic reducing agent and at least one peroxide, hydroperoxide or peracid. Particularly suitable reducing agents are sulfur compounds, such as the sodium salt of hydroxymethanesulfinic acid, sodium sulfite, sodium disulfite, sodium thiosulfate or acetone-bisulfite adduct, nitrogen compounds such as triethylamine, hydrazine and hydroxylamine, and also ascorbic, glycolic and tartaric acid. Preference is given to initiator systems comprising a small amount of a metal compound which is soluble in the polymerization medium and whose metallic component is able to exist in a plurality of valence states, such as vanadium sulfate, iron(II) sulfate or iron complexes, an example being the complex of iron with ethylenediaminetetraacetic acid (as the sodium salt; Fe(II)-EDTA-sodium salt). The amount of free-radical initiators employed, based on the overall amount of monomers to be polymerized, is preferably from 0.1 to 2% by weight.

Surface-active substances suitable for conducting the emulsion polymerization are the emulsifiers and protective colloids which are commonly employed for these purposes. The surface-active substances are employed customarily in amounts of up to 20% by weight, preferably from 0.1 to 10% by weight, and in particular, from 0.5 to 5% by weight, based on the monomers to be polymerized. The surface-active substances remain in the polymer formulations of the invention and thus also determine their performance properties.

As surface-active substances it is preferred to employ exclusively emulsifiers, whose relative molecular weights, in contradistinction to those of the protective colloids are usually below 2,000. Preference is given to anionic emulsifiers or to combinations of at least one anionic and one nonanionic emulsifier.

The anionic emulsifiers include alkali metal salts and ammonium salts of alkyl sulfates (alkyl: $C_8$–$C_{12}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$).

Preferred anionic emulsifiers are compounds of the formula III

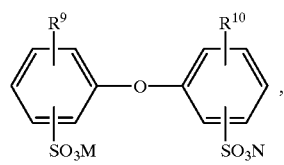

(III)

in which $R^9$ and $R^{10}$ are hydrogen or $C_4$–$C_{24}$-alkyl but are not both hydrogen and M and N can be alkali metal and/or ammonium ions. In the formula III $R^9$ and $R^{10}$ are preferably linear or branched alkyl radicals of 6 to 18 carbon atoms or hydrogen, and especially 6, 12 or 16 carbon atoms, but are not both hydrogen. M and N are preferably sodium, potassium or ammonium ions, with sodium being particularly preferred. Particularly advantageous compounds of the formula III are those in which M and N are sodium, $R^9$ is a branched alkyl radical of 12 carbon atoms and $R^{10}$ is hydrogen or $R^9$. It is common to use technical-grade mixtures containing from 50 to 90% by weight of the monoalkylated product, an example being Dowfax® 2A1 (trade mark of DOW Chemical Company). The compounds of the formula III are widely known, from U.S. Pat. No. 4,269,749, for example, and obtainable commercially.

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, average degree of ethoxylation: from 3 to 50) and, of these, particular preference to those based on oxo alcohols and naturally occurring alcohols having a linear or branched $C_{12}$–$C_{18}$-alkyl radical and a degree of ethoxylation of from 8 to 50.

Further suitable emulsifiers can be found in Houben-Weyl, Methoden der organischen Chemie, Volume XIV/1, Makromolekulare Stoffe [Macromolecular substances], Georg-Thieme-Verlag, Stuttgart, 1961, pp. 192–208.

In the course of the polymerization it is possible to employ regulators in amounts, for example, of up to 1% by weight based on 100% by weight of the monomers to be polymerized. These regulators reduce the molecular mass of the polymers, and suitable examples are compounds having a thiol group such as tert-butyl mercaptan, tert-dodecyl mercaptan, thioglycolic acid, its esters, mercaptoethanol or mercaptopropyltrimethoxysilane.

The emulsion polymerization generally takes place at from 30 to 130° C., preferably from 50 to 100° C. The polymerization medium can consist either of water alone or of mixtures of water and water-miscible liquids such as methanol, ethanol and isopropanol. It is preferred to use water alone. The emulsion polymerization can be conducted either as a batch process or in the form of a feed process, including a staged or gradient procedure. Preference is given to the feed process, in which the monomers are supplied in pure or emulsified form to the polymerization zone continuously, in stages or under a concentration gradient, during which the polymerization is maintained. With the feed process the individual components can be added to the reactor from the top, through the side or from below, through the reactor floor.

In order, for example, to establish the particle size more effectively it is also possible to introduce a polymer seed (aqueous seed latex) into the initial polymerization charge. The seed latex generally has a weight-average particle size of from 10 to 200 nm and, in particular, from 20 to 100 nm and, especially, from 25 to 50 nm. Examples of its constituent monomers are styrene, methyl methacrylate, n-butyl acrylate and mixtures thereof.

The manner in which the initiator is added to the polymerization vessel in the course of the free-radical aqueous emulsion polymerization depends, as the skilled worker is aware, on the chemical nature of the initiator system and on the temperature of polymerization. The initiator can either be included entirely in the initial charge to the polymerization vessel or else added continuously or in stages as a solution or in bulk at the rate at which it is consumed in the course of the free-radical aqueous emulsion polymerization.

To remove the residual monomers it is common to follow the polymerization by a physical deodorization achieved, for example, by distilling off the volatile monomers with steam and/or by a chemical deodorization. The latter involves adding a further initiator, for instance a redox initiator, after the end of the actual emulsion polymerization: that is, after a monomer conversion of at least 95%.

In this way, it is possible to obtain aqueous dispersions of the polymers A having polymer contents of up to 70% by weight based on the overall weight of the respective polymer dispersion. On practical grounds it is preferred to use dispersions of the polymers A having polymer contents in the range from 30 to 60% by weight. The polymer particles in the dispersions of the polymer A generally have a weight-average diameter in the range from 50 to 1,000 nm (determined by means of an ultracentrifuge or by photon-correlation spectroscopy; on determining particle size using an ultracentrifuge see e.g. B. W. Mächtle, Makromolekulare Chemie, 1984, 185, 1025–1039, and W. Mächtle, Angew. Makromolekulare Chemie, 1988, 162, 35–42). In the case of binder dispersions having high solids contents, e.g. >50% by weight based on the overall weight of the binder dispersion, it is advantageous on viscosity grounds for the weight-average diameter of the polymer particles of the dispersion to be $\geq 150$ nm. The average particle diameter will preferably not exceed 600 nm.

The compound B generally comprises low molecular mass polyaldehydes, among which the dialdehydes are particularly preferred. Preferred compounds B are aliphatic dialdehydes of the formula II

where n is from 0 to 10 and, in particular, from 0 to 4 or a derivative thereof whose aldehyde groups are reversibly protected in the form, for example, of a hemiacetal or acetal of a $C_1$–$C_4$ alcohol. By way of example, mention may be made of glyoxal and glutaraldehyde or malonaldehyde and their acetals and hemiacetals. Also suitable, however, are compounds such as terephthalaldehyde. Glyoxal is used with particular advantage. Other suitable compounds B are homo- and cooligomers and also homo- and copolymers of ethylenically unsaturated aldehydes, such as of formylstyrene, acrolein and/or methacrolein, whose aldehyde groups may have been reversibly protected.

In general, the amount of compound B in the polymer formulations employed in accordance with the invention is chosen such that the molar ratio of aldehyde groups in compound B to the copolymerized monomers M1 in polymer A is in the range from 1:10 to 10:1, preferably in the range from 1:5 to 2:1 and, in particular, about 1:1. The weight ratio of polymer A to compound B is generally in the range from 5,000:1 to 20:1 and, preferably, in the range from 1,000:1 to 100:1.

The pH of the aqueous polymer formulation of the invention is not particularly critical for the mechanism of action embraced by the aqueous polymer formulations of the invention. It is usually from 2 to 12, preferably >7 to 10.

The aqueous polymer formulations of the invention can of course be used as a mixture with different aqueous polymer formulations.

In accordance with the invention, the formulations comprising polymer A and compound B are used to coat substrates comprising polyurethane. The formulations can be employed as unpigmented and unfilled formulations, for example, as clearcoats, as colorless sealing compounds or sealants. Such formulations generally include from 20 to 60% by weight of at least one polymer A, from 0.05 to 5% by weight, based on the polymer A, of at least one compound B, from 0.1 to 20% by weight of auxiliaries, and water to 100% by weight.

In another embodiment of the invention the formulations comprising polymer A and compound B include at least one inorganic filler and/or an inorganic pigment. Formulations of this kind are used in particular for the coating of flat roofs.

Pigmented formulations generally comprise from 40 to 90% by weight and, in particular, from 50 to 85% by weight of nonvolatile constituents, i.e., polymeric constituents plus fillers and pigments. The pigmented formulations employed in accordance with the invention contain from 10 to 50% by weight, preferably from 20 to 40% by weight, of at least one polymer A from 0.01 to 1% by weight, based on the polymer A, of at least one compound B from 10 to 70% by weight, preferably from 30 to 65% by weight, of inorganic fillers and/or inorganic pigments, from 0.1 to 20% by weight, preferably from 0.5 to 10% by weight, of customary auxiliaries and water to 100% by weight.

Examples of suitable fillers are alumosilicates, silicates, alkaline earth metal carbonates, preferably calcium carbonate in the form of calcide or chalk, dolomite, and also aluminum silicates or magnesium silicates such as talc.

An example of a typical pigment is titanium dioxide, preferably in the rutile form. However, and especially when used for decorative purposes, the coating compositions may also include colored pigments, examples being iron oxide.

Customary auxiliaries include wetting agents, such as sodium or potassium polyphosphates, polyacrylic acids, their alkali metal salts, polyvinyl alcohols, etc. Furthermore, these coating compositions generally include viscosity modifiers, examples being cellulose derivatives, such as hydroxyethylcellulose, methylcellulose and carboxymethylcellulose, and also polyvinylpyrrolidone, polyvinyl alcohol, salts of acrylic and methacrylic acid polymers, and also associative thickeners, such as styrene-maleic anhydride copolymers and hydrophobically modified polyetherurethanes. The polymer formulations may also include dispersants, antifoams, preservatives or hydrophobicizing agents, biocides, colorants and/or fibers. In addition, for the purpose of adjusting the film-forming properties of the polymer A, the polymer formulations may comprise solvents or plasticizers, examples being ethylene glycol, propylene glycol, butylene glycol, hexylene glycol, diethylene glycol monoethyl ether, diethylene glycol monoethyl ether acetate, diethylene glycol monobutyl ether, hexylene glycol diacetate, propylene glycol monoethyl, monophenyl, monobutyl and monopropyl ethers, dipropylene glycol monomethyl ether, dipropylene glycol mono-n-butyl ether, tripropylene glycol mono-n-butyl ether, butoxybutyl acetate, and also alkyl esters of aliphatic mono- and dicarboxylic acids, an example being Texanol® from Eastman, or technical-grade mixtures of dibutyl esters of succinic, glutaric and adipic acids. Other film-forming auxiliaries which may be present in the formulations of the invention are hydrocarbons and mixtures thereof with or without aromatic constituents, examples being white spirits of the boiling range from 140 to 210° C.

To reduce the surface tack the formulations of the invention may include up to 5% by weight, based on the polymer A, of photosensitive initiators. Suitable photoinitiators include a group which is able to absorb a fraction of sunlight. The formulation may comprise the photoinitiator additive either in the form of a photosensitive compound or in the form of a photosensitive oligomer or polymer. It is likewise possible for the photosensitive group to be attached chemically to the polymer by means, for example, of copolymerization. The use of photoinitiators in coating compositions is described, for example, in EP-A 010 000, DE-A 4 318 083 or EP-A 624 610. Coating compositions based on polymers which contain photosensitive groups are described, for example, in U.S. Pat. No. 3,429,852, U.S. Pat. No. 3,574, 617 and U.S. Pat. No. 4,148,987.

Suitable photosensitive compounds for the stated purpose are benzophenone derivatives, examples being 4-methylbenzophenone, 4-hydroxybenzophenone, 4-aminobenzophenone, 4-chlorobenzophenone, 4-carboxybenzophenone, 4,4'-dimethylbenzophenone, 4,4'-dichlorobenzophenone, 4-carboxymethylbenzophenone and 3-nitrobenzophenone. Also suitable are substituted phenyl ketones, such as substituted phenylacetophenones and the like.

Features of the coating compositions of the invention are their high level of adhesion to hydrophobic substrates on surfaces, for example, of moldings, molding compounds or structural components comprising polyurethanes, on coatings based on polyurethanes, and on surfaces of solid polyurethane foams. In addition, the formulations of the invention adhere to the surface of structural components made of polyolefins, such as polyethylene, polypropylene, EPM and/or EPDM plastics. A high level of adhesion to said hydrophobic substrates is ensured for the formulations of the invention both in the moist state and in the dry state. The surface of the coatings is nontacky and shows little tendency to pick up dirt. The high tear strength of the coatings is matched by their high extensibility. Their propensity to absorb water is low. These qualities predestine the formulations comprising polymer A and compound B in particular as coating compositions for exterior applications in architectural protection: for example, for coating flat-roof constructions which have a polyurethane foam insulating coat or which are composed of blocks or other structural elements made from polyurethane foams.

Since the formulations of the invention generally comprise flowable formulations, they can be applied to the target substrate in a conventional manner: for example, with fine brushes or rollers, coarse brushes, knife or bar coaters or spray devices, or by pouring.

The examples indicated below are intended to illustrate the invention though without limiting it.

1. Preparation and Characterization of the Polymer Dispersions

The particle size (z-average) of the polymer was determined by dynamic light scattering on a 0.01% by weight dispersion at 23° C. using an Autosizer IIc from Malvern Instruments, UK. The value reported is the cumulant z-average diameter of the measured autocorrelation function.

Dispersion D1

A vessel with stirrer was charged with 200 g of deionized water, 10.2 g of polystyrene latex (33% by weight) and 1 mg of Na-Fe-EDTA complex. It was then flushed with an inert gas and heated to 90° C. On reaching the temperature, the monomer emulsion and the initiator solution were introduced into the polymerization vessel via separate feeds over the course of 2.5 h beginning simultaneously. The batch was subsequently reacted at 90° C. for 1 hour and then cooled to 70° C. Then, in order to reduce the residual monomer content, 6.1 g of a 12.3% strength by weight aqueous solution of tert-butyl hydroperoxide and 9.2 g of a 7.4% strength by weight aqueous solution of the bisulfite adduct of acetone were added and the mixture was reacted at 70° C. for 30 minutes. It was cooled to room temperature and the pH was adjusted to 9.0 with 10% strength sodium hydroxide solution. The dispersion obtained had a solids content of 56% by weight. The average particle diameter was 250 nm. The glass transition temperature of the polymer was −28° C.

Monomer Emulsion:

255.0 g of water 16.7 g of Dowfax® 2A1 (45% strength by weight solution in water)

93.8 g of an ethoxylated $C_{16}$–$C_{18}$ fatty alcohol having an average degree of ethoxylation of 18 (20% strength by weight solution in water)

133.1 g of 2-ethylhexyl acrylate 487.5 g of n-butyl acrylate 61.9 g of methyl methacrylate 15.0 g of methacrylic acid 67.5 g of a 25% strength by weight solution of N-(methacryloyloxyethyl)imidazolidin-1-one in methyl methacrylate Initiator Solution:

2.25 g of sodium peroxodisulfate in 50 g of water.

Dispersion D2

A dispersion D2 was prepared following the preparation procedure indicated for the dispersion D1 but with a different monomer composition. The pH of the dispersion was adjusted to 8.5 with 10% sodium hydroxide solution. The dispersion obtained had a solids content of 56.4% by weight. The average particle diameter was 245 nm and the glass transition temperature was −30° C.

Monomer Emulsion:

255.0 g of water 16.7 g of Dowfax® 2A1 (45% strength by weight solution in water)

93.8 g of an ethoxylated $C_{16}$–$C_{18}$ fatty alcohol having an average degree of ethoxylation of 18 (20% strength by weight solution in water)

136.9 g of 2-ethylhexyl acrylate 487.5 g of n-butyl acrylate 73.2 g of methyl methacrylate 15.0 g of methacrylic acid 52.2 g of a 25% strength by weight solution of N-(methacryloyloxyethyl)imidazolidin-1-one in methyl methacrylate Dispersions D1a and D2a (according to the invention):

A 40% strength by weight aqueous glyoxal solution was added to dispersion D1 so that the glyoxal content, based on the polymer in the dispersion, was 0.33% by weight. Similarly, the glyoxal content in dispersion D2 was adjusted to 0.26% by weight (based on polymer).

2. Preparation of Pigmented Formulations

The pigmented formulations were prepared by blending the following components in the stated order with dispersions D1, D1a and D2a in a dissolver.

| | |
|---|---|
| Dispersion (55%) | 32.2 parts |
| Defoamer[1] | 0.5 part |
| Propylene glycol | 2.3 parts |
| Dispersant[2] | 0.5 part |
| Titanium pigment (rutile 0.3 μm) | 11.5 parts |
| Calcium carbonate (10 μm) | 27.0 parts |
| Calcium carbonate (2 μm) | 1.4 parts |
| Talc (6 μm) | 8.5 parts |
| Commercial biocide[3] | 0.2 part |
| Dispersion (55%) | 14.0 parts |
| Defoamer[1] | 0.5 part |
| Water | 1.5 parts |

[1]Defoamer BYK 035 (BYK Chemie, Wallingford CT, USA)
[2]Dispersant Calgon ® TK, BK-Ladenburg GmbH, Germany
[3]1,2-benzisothiazolin-3-one 3. Adhesion Test Blocks of commercial polyurethane foam for roof constructions (roof grade 3 lb/ft$^3$) from American Coatings of Greensboro (Greensboro, N.C., USA) were coated over an area >25.4 mm×250 mm with the coating compositions from 2. Then a glass fiber fabric measuring 25.4 mm×250 mm was placed lengthwise over the coated area. After 4 h at room temperature a further coating of the compositions of the invention was applied to the glass fiber fabric and the coated blocks were dried at room temperature for 14 days. The coating was then removed by pulling on the glass fiber strip. An assessment is made of whether the surface of the polyurethane foam is destroyed when the coating is removed (cohesive fracture) or remains undestroyed (adhesive fracture). To determine the wet adhesion the specimen was immersed for 14 days with the coated area in water and then tested. The results are summarized in Table 1.

4. Tear Strength and Extensibility

The coating compositions were knife coated onto a Teflon-coated surface so as to give a dry coat thickness of from 0.3 to 0.4 mm. After 4 h of drying in air a further coat of equal thickness was applied. After 1 to 2 days the film was carefully removed from the Teflon surface and was suspended vertically for 14 days at 23° C. and 50% atmospheric humidity.

The tear strength and elongation at break were determined using an Instron-Tensile Tester in a method similar to that of DIN 53 455 and DIN 53 504. Each of the measured values reported are means of 5 measurements on 5 test specimens. These specimens were punched from the films. The format of the specimens used was the dumbbell format described in DIN 53 504 as standard rod S2. The thickness of the samples was examined with a calipers to DIN 53 370 with circular contact pieces 10 mm in diameter. The specimens were clamped in the jaws of a tensile tester and torn at a pulling speed of 5 mm/min. The elongation at break is the elongation at the moment of tearing. It refers to 23° C. and 1 atm. It is stated as $[(l-l_0)/l_0] \times 100$ (%), where $l_0$=original measured length, l=measured length on tearing. Correspondingly, the tear strength is the force applied at the moment of tearing. It is usually reported based on the cross section. The results are compiled in Table 1.

5. Determination of Water Absorption

The films prepared in 4. were weighed, placed in water, dried off after 96 h and reweighed. The percentage increase in weight is a measure of the water absorption (Table 1).

6. Determination of the Surface Tack

The surface tack of coatings prepared in a similar manner to the coatings for the adhesion test (see 3.) was determined by the finger test method. The results are compiled in Table 1.

being present in dispersed form in the aqueous formulation, and said monomers M comprising:

from 70 to 94.8% by weight of n-butyl acrylate, 2-ethylhexyl acrylate or mixtures thereof, from 5 to 25% by weight of styrene, methyl methacrylate, ter-butyl methacrylate or mixtures there, from 0.1 to 5% by weight of at least one monomer M1 of the formula I, and from 0.1 to 5% by weight of at least one monomer M3 having an acid function or salt thereof, wherein the monomers M1 are selected from monomers of the formula I

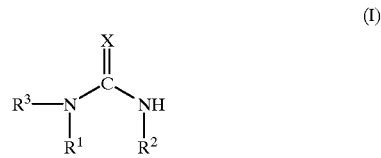

where $R^1$ and $R^2$ independently of one another are hydrogen, linear or branched $C_1$–$C_5$-alkyl or, together are $C_2$–$C_4$-alkylene group which is unsubstituted or substituted once or twice by $C_1$–$C_5$-alkyl, $C_1$–$C_4$-alkoxy and/or hydroxyl, X is oxygen or sulfur, and $R^3$ is a monoethylenically unsaturated radical of 2 to 20 carbon atoms, wherein the polymer A has a glass transition temperature Tg in the range from –40 to –10° C., and ii) at least one compound B having two or more aldehyde groups.

2. The method as claimed in claim 1, where the substrate to be coated is a polyurethane foam.

3. The method as claimed in claim 1, where the molar ratio of the aldehyde groups of the compound B to the monomers M1 copolymerized in polymer A is in the range from 10:1 to 1:10.

TABLE 1

| Examples | UMA/glyoxal[1] (% by wt./% by wt.) | Adhesion to PU foam[2] | | Tear strength (N/mm²) | Elongation at break (%) | Water absorption (%) | Surface tack |
|---|---|---|---|---|---|---|---|
| | | dry | wet | | | | |
| C 2 | 2.25/0 | 0 | 0 | 0.60 | 350 | 11.9 | tacky |
| I 1 | 2.25/0.33 | 1 | 1 | 1.3 | 160 | 5.8 | non-tacky |
| I 2 | 1.75/0.26 | 1 | 1 | 1.2 | 150 | 6.5 | non-tacky |

[1]UMA = N-(2-methacryloyloxyethyl)imidazolidin-1-one; % by weight based on 100% by weight monomers
[2]0: adhesive fracture
1: cohesive fracture, tearing of the glass fiber fabric

We claim:

1. A method of coating a substrate consisting essentially of polyurethanes, said method comprising applying an aqueous formulation onto the substrate to be coated, said aqueous formulation comprising:

i) at least one film-forming polymer A obtained from ethylenically unsaturated monomers M, said polymer A 4. The method as claimed in claim 1, where the compound B is an aliphatic dialdehyde of the formula II

where n is from 0 to 10 and, in particular, from 0 to 4, or a derivative thereof whose aldehyde groups are reversibly protected.

5. The method as claimed in claim 1, where the monomer M1 is selected from N-(2-methacryloyloxyethyl)imidazolin-2-one, N-(2-methacrylamidoethyl)imidazolin-2-one and N-[(3-allyloxy-2-hydroxypropyl)aminoethyl]imidazolin-2-one.

6. The method as claimed in claim 1, where the aqueous formulation comprises from 10 to 50% by weight of at least one polymer A from 0.05 to 5% by weight based on the polymer A, of at least one compound B from 10 to 70% by weight of inorganic fillers and/or inorganic pigments from 0.1 to 20% by weight of customary auxiliaries and water to 100% by weight.

7. The method as claimed in claim 1, wherein monomer $M_3$ is an ethylenically unsaturated carboxylic acid.

8. The method as claimed in claim 7, wherein $M_3$ is acrylic and/or methacrylic acid.

* * * * *

UNITED STATES PATENT AND TRADEMARK OFFICE
CERTIFICATE OF CORRECTION

PATENT NO.   : 6,265,028 B1
DATED        : July 24, 2001
INVENTOR(S)  : Cheng-Le Zhao et al.

Page 1 of 1

It is certified that error appears in the above-identified patent and that said Letters Patent is hereby corrected as shown below:

Column 3,
Line 32, "$CH_2$—NH—$CH_2$—$CH_2$—$CH_2$=CH—$CH_2$—O—$CH_2$—" should read -- $CH_2$—NH—$CH_2$—$CH_2$—, $CH_2$=CH—$CH_2$—O—$CH_2$— --;
Line 33, "CH(OH)—$CH_2$—O—$CH_2$—$CH_2$—$CH_2$=C($CH_3$)—" should read -- CH(OH)—$CH_2$—O—$CH_2$—$CH_2$—, $CH_2$=C($CH_3$)— --;
Line 34, "$CH_2$—, $CH_2$=C($CH_3$)—C(O)—, $CH_2$=CH—C(O)—" should read -- $CH_2$—, $CH_2$=C($CH_3$)—C(O)—, $CH_2$=CH—C(O)—, --;
Line 40, "$CH_2$—$CH_2$—$CH_2$=CH—C(O)—NH—$CH_2$—C(O)—O—" should read -- $CH_2$—$CH_2$—, $CH_2$=CH—C(O)—NH—$CH_2$—C(O)—O— --;
Line 43, "(O)—NH—$CH_2$—$CH_2$—$CH_2$=C($CH_3$)—C(O)—NH—" should read -- (O)—NH—$CH_2$—$CH_2$—, $CH_2$=C($CH_3$)—C(O)—NH— --.

Column 5,
Line 57, "approximation by the" should read -- approximation by the formula --.

Column 6,
Line 22, "the two nitrites" should read -- the two nitriles --.

Column 14,
Line 7, "ter-butyl" should read -- tert-butyl --;
Line 8, "there," should read -- thereof, --.

Signed and Sealed this

Thirtieth Day of April, 2002

Attest:

Attesting Officer

JAMES E. ROGAN
*Director of the United States Patent and Trademark Office*